March 6, 1962  A. J. URBANETTI  3,024,150
METHOD AND MEANS FOR MAKING A GLASS FIBER PRODUCT
Filed Dec. 9, 1957
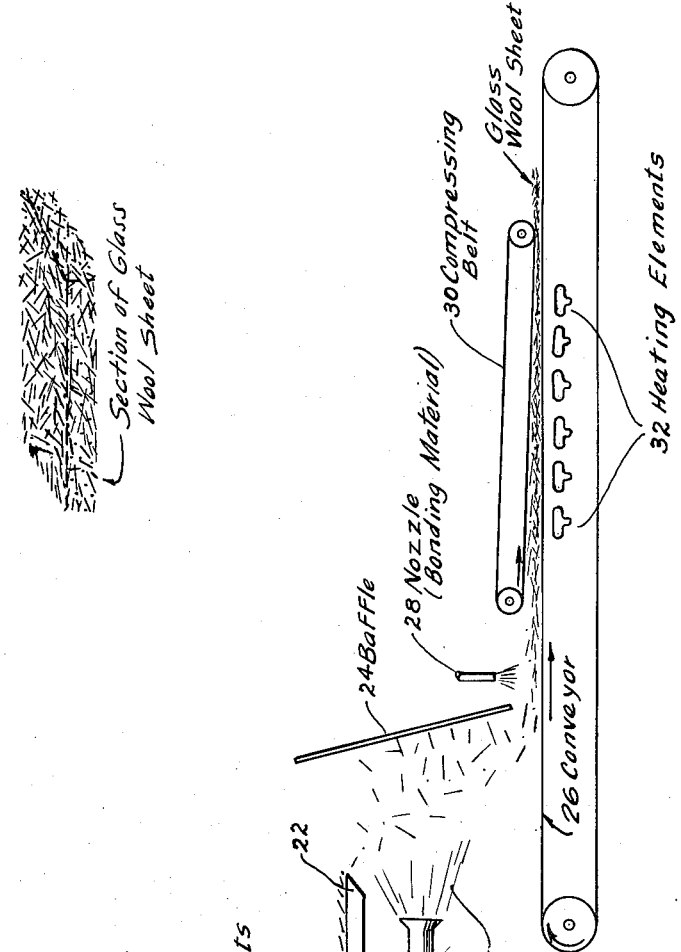
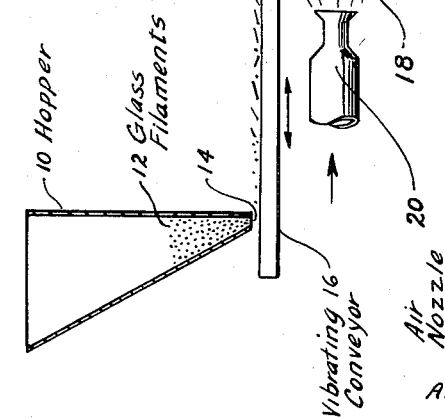
INVENTOR.
ANTHONY J. URBANETTI
BY
Teller & McCormick
ATTORNEYS United States Patent Office 3,024,150
Patented Mar. 6, 1962

3,024,150
METHOD AND MEANS FOR MAKING A GLASS FIBER PRODUCT
Anthony J. Urbanetti, 13 Green Manor Road, Manchester, Conn.
Filed Dec. 9, 1957, Ser. No. 701,454
2 Claims. (Cl. 156—36)

This invention relates to improved glass wool and to a method and apparatus for producing same.

It is the general object of the invention to provide glass wool containing haphazardly arranged glass fibers or filaments which glass wool is devoid of globules and beads of glass and which is of uniform density throughout.

It is a further object of the invention to provide an improved method of producing glass wool containing generally rectilinear glass filaments or fibers in a loose haphazard or jackstraw arrangement.

It is a still further object of the invention to provide apparatus to facilitate the production of glass wool in accordance with my improved method, said apparatus being adaptable for producing glass wool containing haphazardly arranged generally rectilinear glass filaments of substantially uniform length and cross section and glass wool containing haphazardly arranged generally rectilinear glass filaments of varying length and cross section and being further adaptable for producing glass wool of selected density and thickness characteristics as will be apparent from the description which follows.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a diagrammatic longitudinal view partially in section and showing the apparatus used in practicing my method of producing glass wool; and FIG. 2 is a pictorial representation of a section of glass wool provided in accordance with the present invention.

Glass wool has been used heretofore for a variety of purposes and has been found particularly useful in the fields of electrical, sound and heating insulation and in the fields of air purification, air conditioning and humidity control. While the present invention is not to be construed as being so limited, the glass wool provided in accordance therewith is particularly useful in these last mentioned fields of air treatment. It will be apparent that the requirements of glass wool to be used for treating air or other gaseous mediums are particularly rigid. That is, glass wool of uniform or selected density is especially desirable in these fields.

In accordance with the present invention, the glass filaments or fibers used in producing the glass wool are generally rectilinear. Various methods employed for producing such filaments or fibers are well known, one method of producing filaments suitable for the purposes of this invention being disclosed by the Lebro T. Urbanetti Patent No. 2,711,054.

As mentioned above, generally rectilinear glass filaments of varying lengths and cross sections as well as similar filaments of substantially uniform length and cross section may be utilized in producing the glass wool of this invention. However, for purposes of example, and in order that the invention may be readily understood, the following detailed explanation of the method and apparatus of the present invention is directed primarily to the production of glass wool from filaments of uniform length and cross section.

Referring particularly to FIG. 1 of the drawing, it will be observed that a hopper 10 is provided for receiving a plurality of glass filaments 12 of uniform length and cross section, the said filaments being preferably disposed within the hopper 10 in parallel arrangement with each other. An aperture 14 is provided at the bottom of the hopper 10 and is suitably sized for allowing the filaments 12 to fall at a preselected rate upon a vibrator 16 which is located below the said hopper and in spaced relation therewith.

The vibrator 16, which serves to initially disarrange the filaments 12 as well as to convey the said filaments generally horizontally to the right for the next succeeding operation, may comprise a generally flat member which is preferably inclined slightly downwardly when viewed from left to right. The said flat member is vibrated at a frequency suitable for disarranging and for conveying the filaments 12 without causing breakage thereof by conventional vibrating means, not shown.

As the filaments 12 reach the right-hand end of the vibrator 16, they are allowed to fall freely downwardly into a stream of compressed air 18. A nozzle 20, which may be supplied with air under pressure by any well-known means, directs the stream of compressed air 18 rightwardly from a location below the right-hand terminus 22 of the vibrator 16. The filaments 12 falling into the said stream of compressed air from the vibrator are suspended therein and carried rightwardly and are further disarranged prior to encountering an inclined baffle 24 disposed in the path of the compressed air stream 18. The baffle 24 is preferably inclined slightly to the left at its upper end whereby to divert the filaments 12 borne by the air stream 18 downwardly to a conveyor where they come to rest in a haphazard arrangement.

The conveyor, which may be of any conventional type, but preferably comprises an endless belt 26 disposed generally horizontally carries the filaments 12 arranged in haphazard fashion thereon to the right past the baffle 24 and past means adapted for applying bonding material to the said filaments. Said means adapted for applying bonding material may comprise a nozzle element 28 which is adapted for distributing a fine spray of bonding material over the haphazardly arranged filaments. Any conventional bonding material may be utilized for the purposes of this invention, it being preferred practice to utilize one of the thermo-setting plastics which are known to provide excellent adhesion between glass filaments.

Means for progressively compressing the filaments 12 as they are transported by the conveyor belt 26 are provided in accordance with the present invention and said means may comprise a second and smaller endless belt 30 disposed to the right of the nozzle element 28 and above and in spaced relation with the conveyor belt 26. The endless belt 30 is preferably driven in timed relation with the conveyor belt 26 by conventional means, not shown, and the belt 30 is preferably vertically adjustable such that the space between its lowermost surface and the uppermost surface of the belt 26 may be varied. The said belt 30 is also preferably inclined downwardly when viewed from left to right so as to progressively apply compressive forces to the haphazardly arranged filaments 12 as they are carried thereunder by the conveyor belt 26.

In accordance with the preferred practice wherein a thermo-setting plastic is used for the purpose of bonding the filaments 12, heating means are provided for setting the plastic distributed over the filaments by the nozzle element 28. Said means may comprise the heating elements 32, 32 which may be of any well-known type. The heating elements 32, 32 are preferably disposed beneath the uppermost pass of the conveyor belt 26 so as to provide for setting of the plastic as the glass filaments 12 are being compressed between the conveyor belt 26 and the compressing belt 30.

The glass filaments 12, anchored in a compressed haphazard arrangement by the bonding material, emerge as a sheet of glass wool from between the belts 26 and 30. The sheet of glass wool may then be severed and trimmed by conventional means as required for its intended use, a typical pack or cell of glass wool which might be cut from such a sheet being illustrated in FIG. 2.

The glass wool produced in accordance with the method and apparatus of this invention will, as a result of the filaments 12 being thoroughly disarranged by the vibrator 16 and the air stream 18 and deposited haphazardly on the conveyor belt 26, comprise a substantially uniform mixture of generally uniform filaments in a haphazard or loose "jackstraw" arrangement. As a result, the said glass wool is of uniform density throughout whereby a product generally superior to glass wool provided in accordance with processes heretofore known is obtained. While there may be some breakage of glass filaments involved in the production of glass wool in accordance with the present invention, it has been found that such breakage does not serve to cause significant non-uniformity in density. The reason for this is believed to be that breakage occurs uniformly; that is, a substantially constant percentage of the glass filaments are broken throughout the glass wool sheet. Further, since the method of producing glass wool in accordance with the present invention contemplates the use of glass filaments which have been preformed and does not contemplate the use of glass in a molten or semi-molten state for the formation of glass wool, the wool obtained is completely free of globules or beads of glass which might result in areas of non-uniform density.

It will be apparent from the foregoing description of the method and apparatus for producing glass wool that the density and thickness characteristics of the glass wool sheet provided is determined principally by the type of glass filaments used, the rate at which they are deposited on the vibrator 16 by the hopper 10, the speed at which the conveyor belt 26 and the compressing belt 30 are driven and by the space between the said two belts. Thus, it will be seen that by suitably adjusting the apparatus of this invention, glass wool having a variety of characteristics may be provided.

Succeeding sheets of glass wool of different densities but of uniform thickness may be provided, for example, from a supply of glass filaments of a single length and cross section. Either the rate at which the filaments are deposited by the hopper 10 on the vibrator 16 or the speed at which the belts 26 and 30 or both may be altered, the space between the belts 26 and 30 being maintained constant, in order to provide sheets of glass wool having these characteristics. If, on the other hand, glass filaments of a single length and cross section are supplied to the hopper 10 and deposited thereby on the vibrator 16 at a constant rate throughout the operation of the apparatus and the speed of the belts 26 and 30 is similarly maintained at a constant level, the space between the belts 26 and 30, however, being altered, succeeding sections or sheets of the glass wool produced will be of different densities and thicknesses.

Generally rectilinear glass filaments of non-uniform length and/or cross section may be similarly utilized in the production of glass wool of selected density and thickness characteristics. For example, an alternative method of producing succeeding sections or sheets of glass wool of uniform thickness but of different densities may comprise supplying the hopper 10 with succeeding layers or strata of glass filaments of different lengths and/or cross sections and operating the apparatus of this invention such that the rate of feed of filaments from the hopper 10 to the vibrator 16, the speeds of the belts 26 and 30 and the space therebetween are all maintained constant. It will be apparent that by virtue of the different lengths and/or cross sections of the glass filaments which comprise succeeding sections or sheets of the glass wool thus produced, the density of the sections or sheets will be different from each other while the thickness of each will be the same.

A further type of glass wool which may be desirable for some applications is one comprising a homogeneous mixture of glass filaments of different lengths and/or cross sections. The method and apparatus of this invention are readily adaptable for producing glass wool of this type. A homogeneous mixture of filaments of different lengths and/or cross sections would be placed in the hopper 10 and the belts 26 and 30 operated at constant or varying speeds and spaced at constant or varying distances as required for producing glass wool having the density and thickness characteristics desired.

It will be quite apparent from the foregoing that glass wool having a great variety of characteristics may be provided by suitably selecting the filaments disposed in the hopper 10 and by providing a variety of arrangements of filaments therein and by adjusting the rate of feed of said hopper, the speed of the belts 26 and 30 and the space therebetween. Accordingly, the invention is not to be construed as being limited to glass wool comprising any particular mixture of generally rectilinear glass filaments or to glass wool having any particular density or thickness characteristics other than by the claims which follow.

The invention claimed is:

1. The method of forming a glass wool sheet having haphazardly disarranged glass filaments therein, said method including placing a plurality of generally rectilinear glass filaments in a hopper, discharging said filaments downwardly from said hopper onto an inclined conveyer, vibrating said filaments on said conveyor to initially disarrange same while simultaneously conveying said filaments generally horizontally from said hopper, causing said disarranged filaments to fall downwardly from said vibrating conveyor into a stream of air under pressure wherein said filaments are suspended and further disarranged, projecting said further disarranged filaments against an inclined baffle structure disposed in the flow path of the stream of air to divert the suspended filaments generally downwardly onto a substantially horizontally disposed conveyer whereon said filaments come to rest in haphazard disarrangement, spraying the haphazardly disarranged filaments with a bonding material, and then progressively compressing the haphazardly disarranged filaments while simultaneously heating and conveying same to anchor the filaments in haphazard disarrangement to create a sheet of glass wool.

2. Apparatus for producing glass wool containing generally rectilinear glass filaments haphazardly disarranged therein, said apparatus comprising in combination, a hopper for receiving a supply of such filaments, means for discharging such filaments generally downwardly from the hopper at a preselected rate of discharge, vibrator-conveyer structure for receiving such discharged filaments from said hopper to convey such discharged filaments generally horizontally away from the hopper while simultaneously initially promoting a haphazard arrangement to such discharged filaments, and endless belt conveyer disposed generally horizontally and substantially below the vibrator-conveyer structure, a generally horizontally propelled stream of air disposed between the vibrator-conveyer structure and the belt conveyer for receiving such haphazardly arranged filaments from said vibrator-conveyer structure to further haphazardly disarrange such filaments and serve to transport same, an elongated generally upstanding baffle member disposed generally laterally to said stream of air and inclined with the upper end extending toward said stream of air for diverting such haphazardly disarranged filaments generally downwardly into further haphazard disarrangement onto said belt conveyer, means for spraying bonding material on such haphazardly disarranged filaments, an endless belt arranged above said belt conveyer in spaced relationship relative thereto, said endless belt being inclined downwardly in the direction of filament travel to progressively compress such haphazardly disarranged filaments, and means for applying heat to such haphazardly disarranged filaments as they are progressively compressed to anchor the same in compressed haphazard disarrangement.

References Cited in the file of this patent

UNITED STATES PATENTS

| | | |
|---|---|---|
| 1,698,881 | Erdmann | Jan. 15, 1929 |
| 1,827,858 | Tannery | Oct. 20, 1931 |
| 2,577,205 | Meyer et al. | Dec. 4, 1951 |
| 2,639,759 | Simison | May 26, 1953 |
| 2,671,496 | Chavannes | Mar. 9, 1954 |
| 2,860,687 | Cole | Nov. 18, 1958 |